(12) United States Patent
Francois et al.

(10) Patent No.: US 12,433,504 B2
(45) Date of Patent: Oct. 7, 2025

(54) POSITION TRACKING SYSTEM FOR TRACKING AN INTERNAL DEVICE DURING AN IMAGING

(71) Applicants: ROBEAUTE, Paris (FR); SORBONNE UNIVERSITÉ, Paris (FR); CENTRE NATIONAL DE LA RECHERCHE SCIENTIFIQUE, Paris (FR)

(72) Inventors: Quentin Francois, Paris (FR); Bertrand Duplat, Paris (FR); Sinan Haliyo, Paris (FR); Stephane Régnier, Paris (FR); Pierre Zarader, Paris (FR)

(73) Assignees: ROBEAUTE, Paris (FR); SORBONNE UNIVERSITÉ, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 81 days.

(21) Appl. No.: 18/256,710

(22) PCT Filed: Dec. 10, 2021

(86) PCT No.: PCT/EP2021/085293
§ 371 (c)(1),
(2) Date: Jun. 9, 2023

(87) PCT Pub. No.: WO2022/123055
PCT Pub. Date: Jun. 16, 2022

(65) Prior Publication Data
US 2024/0090792 A1    Mar. 21, 2024

(30) Foreign Application Priority Data
Dec. 11, 2020  (EP) ..................... 20306552

(51) Int. Cl.
*A61B 5/06*    (2006.01)
*A61B 5/00*    (2006.01)
(Continued)

(52) U.S. Cl.
CPC ............ *A61B 5/061* (2013.01); *A61B 5/6864* (2013.01); *A61B 34/20* (2016.02);
(Continued)

(58) Field of Classification Search
None
See application file for complete search history.

(56) References Cited

U.S. PATENT DOCUMENTS

| | | | |
|---|---|---|---|
| 6,381,485 B1 | 4/2002 | Hunter et al. | |
| 2007/0225595 A1* | 9/2007 | Malackowski | A61B 34/20 600/424 |

(Continued)

FOREIGN PATENT DOCUMENTS

WO    2020135945 A1    7/2020

OTHER PUBLICATIONS

International Search Report and Written Opinion issued on Feb. 22, 2022, in corresponding International Application No. PCT/EP2021/085293, 16 pages.

*Primary Examiner* — Keith M Raymond
*Assistant Examiner* — Ashish S Jasani
(74) *Attorney, Agent, or Firm* — Maier & Maier PLLC (57) ABSTRACT

A signal tracking system including: one fixation element to be secured to a rigid body part of the patient surrounding a target body part, the fixation element further including a mapping element, one tracker element to be secured to the fixation element to track, in real time, the internal tracker, and a control unit including a memory to store an internal referential and one image displaying the target body part and one fixation element. The control unit is designed to define, inside the internal referential, at least one 3D frame position attached to the at least one fixation element, and to precisely locate each point of the target body part, the control unit is (Continued)

further designed to precisely localize, in real time, the internal tracker inside the target body part.

15 Claims, 3 Drawing Sheets

(51) Int. Cl.
  *A61B 34/20* (2016.01)
  *A61B 90/00* (2016.01)
(52) U.S. Cl.
  CPC . *A61B 2034/2063* (2016.02); *A61B 2090/363* (2016.02); *A61B 2090/378* (2016.02); *A61B 2090/3983* (2016.02); *A61B 2562/0285* (2013.01)

(56) References Cited

U.S. PATENT DOCUMENTS

| | | | |
|---|---|---|---|
| 2008/0269599 A1* | 10/2008 | Csavoy | A61B 90/36 600/426 |
| 2019/0216560 A1* | 7/2019 | Bono | A61B 34/30 |
| 2020/0085505 A1* | 3/2020 | Corpa De La Fuente | A61B 34/20 |
| 2022/0175460 A1* | 6/2022 | Chien | A61B 8/085 |

* cited by examiner

POSITION TRACKING SYSTEM FOR TRACKING AN INTERNAL DEVICE DURING AN IMAGING

FIELD

The present invention relates to a tracking system and a localization method to precisely track and localize, in real time, a signal emitting source inside a patient's body.

BACKGROUND

In modern medicine, it becomes more and more important to be able to precisely localize, in real time, devices emitting signals inserted inside a patient's body in order to fulfil some surgical procedures or some precise and targeted drug deliveries.

This applies, for example, in gene therapy or cell grafts, tumour improved resection and local delivery of drugs active against tumours. As an example, to attain a challenging deep brain tumour, surgeons are well known to be in need of a system able to localize a millimetric device to reach precisely the operation site in real time. In addition, the already complex medical environment needs the tracking systems to be "easy to use", i.e., minimally invasive, reproducible and applicable to patients.

In addition, there is a wider and wider seek for less invasive procedures brought about by both the desirability to reduce side effects for the patients (caused by anaesthesia and openings in the body, for example the skull) and accuracy requirements. Regarding the particular example of the skull, a skull opening, by creating a leak of cerebrospinal fluid, induces a brain shift (potentially up to few cm) which falsifies the targeted operation site (target body part) acquired from a pre-operative imaging technique. It is thus meaningful to find alternative solutions to huge skull openings.

The reduction of the invasiveness can be achieved by decreasing the skull opening(s) size or even by not opening it at all. However, in case of a signal emitting source situated inside the brain, this induces a skull layer to be crossed by the signal. The performance of the localization system is directly impacted by this layer which increases both the depth and the attenuation along the signal path. This can be said for any potential target body part.

The limitation or reduction of body openings thus leads to a search for signal that can be emitted from inside the patient's body and correctly read from outside the body.

Among the known signal tracking technologies, the magnetic field technology, presents position accuracy around the millimeter, which is not appropriate for localizing the increasingly used microdevices. The electromagnetic radio frequencies (EM RF) waves technologies are limited by their centimetric position accuracy, also not fitting the microdevice requirements. The EM optical waves technology is subject to strong absorptions in human tissues, thus strongly limiting the depth of operation and imposing invasiveness to bypass bone layers. EM Very High Frequencies (EM VHF) waves, beyond maximum doses, are known to have an adverse impact on human tissues. magnetic resonance imaging (MRI) technology is capped by its intrinsic trade-off between time and spatial resolution. The use of MRI further prohibits the use of magnetic materials, strongly reducing the number of embeddable systems. Ultrasound waves suffer from some attenuation in tissue layers and from reflection at interfaces, however, those limitation are far lower than the ones linked to electromagnetic technologies.

Regarding the evolution of technologies, it becomes increasingly important to be able to localize a sub-millimetric device, for example a robot, or a catheter extremity, in real time during a surgical procedure while keeping accuracy even under high perturbations. In this context, the tracking system should satisfy several criteria: be safe for humans, be the least invasive, prove the best localization accuracy, be able to operate inside the entire body, in particular the brain, work in real-time, be as small as possible and consume the minimum amount of energy.

In current neuro-navigation, for example, surgeons use well known reference external 3D frames with the hypothesis that the brain doesn't move regarding this external 3D frame. This external 3D frame is a huge cage alike structure which is screwed inside the patient's skull and encircles the patient's whole head. This huge external 3D frame is very bulky, heavy and forces the patient to remain very still, very long. It is thus very uncomfortable to bear. It is also long and difficult to secure on the patient. It also induces some steric hindrance which might restrain the surgeon's movement freedom during the operation. This external 3D frame nevertheless enables the surgeon to have a reference point appearing both on MRI and CT imaging, enabling to align all the images.

In this application, a 3D frame is defined as a coordinate system which origin, orientation, and scale are specified by a set of reference points. Its position is identified both mathematically (with numerical coordinate values) and physically (signaled by conventional markers).

The aim of this invention is to provide a method enabling to align different images obtained by different imaging techniques in a safe, accurate and comfortable way, both for the surgeon and the patient.

SUMMARY

This invention thus relates to a signal tracking system being configured to track an internal tracker situated inside a target body part of a patient, the system comprising:
  at least one fixation element designed to be secured to a rigid body part of the patient, said rigid body part surrounding at least partially the target body part, the fixation element further comprising a mapping element,
  at least one tracker element configured to be secured to the fixation element, the at least one sensor element being designed to track, in real time, the internal tracker,
  a control unit configured to collect, in real time, tracking information from the at least one tracker element, the control unit further comprising a memory designed to store:
    an internal referential,
    at least one unique pre-established image displaying at least a portion of the patient's target body part or an element situated inside said target body part, the unique pre-established image further displaying the at least one fixation element and the at least one mapping element, wherein the control unit is designed to define, inside the internal referential, at least one 3D frame position attached to the at least one fixation element, and to precisely locate each point of the target body part with regards to the 3D frame position, wherein the internal referential is defined within the unique pre-established image displaying at least the portion of the patient's target body part or the element situated inside said target body part, wherein the control unit is further designed to precisely localize, in real time, within the internal referential, the internal tracker inside the target body part with regards to the at least one 3D frame position.

This way, the solution enables to reach the here-above mentioned objective. Especially, it enables to registrate the ultrasound tracking information on a medical image within a single internal referential. It further enables to minimize the error of the registration through an automatic detection of the implant inside said image.

The system according to the invention may comprises one or several of the following features, taken separately from each other or combined with each other:
  the memory is further designed to store:
    the internal referential,
    at least one first pre-established image displaying the patient's target part,
    at least one second pre-established image displaying the rigid body part on which the at least one fixation element and the at least one mapping element are secured,
  wherein the internal referential is defined within the first pre-established image displaying at least the portion of the patient's target body part or the element situated inside said target body part,
  wherein the control unit is designed to align the at least one first and second pre-stablished images within the internal referential, in order to define, inside the internal referential at least one 3D frame position attached to the at least one fixation element, and to precisely locate each point of the target body part with regards to the 3D frame position,
  wherein the control unit is further designed to precisely localize, in real time, within the internal referential, the internal tracker inside the target body part with regards to the at least one 3D frame position,
    the at least one tracker element is configured to be removably secured to the fixation element,
    the at least one fixation element is designed to be secured inside the rigid body part of the patient, the at least one tracker element being also secured, to the fixation element inside the rigid body part,
    the system comprises at least three tracker elements regularly distributed around the target body part,
    the at least one fixation element, mapping element and tracker element are all CT compatible, the at least one second image being a CT image,
    the fixation element and the mapping element are both MRI compatible, the at least one first image being an MRI image,
    the internal tracker is a signal emitting source,
    the internal tracker is a secondary source designed to reflect a signal emitted by a primary source,
    the primary source is external to the subject's body,
    the primary source is the at least one tracker element.
    the internal tracker is a contrast agent dropped by a micro-device,
    the internal tracker is part of a micro-device.

The invention also relates to a signal tracking method configured to position, within an internal referential, an internal tracker situated inside a target body part by means of a tracking system according to any one of the preceding claims, the method comprising following steps in the chronological order of enunciation:

securing at least one mapping element by means of at least one fixation element on the patient's rigid body part,
establishing at least one unique image displaying at least a portion of the patient's target body part or an element situated inside said target body part, said image further displaying the at least one fixation element and the at least one mapping element,
storing the at least one unique image in the memory of the control unit,
aligning the at least one unique image with the internal referential,
detecting, by means of the control unit the position of the at least one mapping element, in order to determine the 3D frame position of each fixation element with regards to the internal referential,
securing, if necessary, the tracker elements on the fixation elements,
starting the signal emission of the internal tracker,
tracking and localizing, in real time, by means of the control unit the internal tracker.

The method may include following steps taken separately from each other or combined with each other:
  the method comprises following steps in the chronological order of enunciation:
  establishing at least one first image displaying the patient's target body part and storing it in the memory of the control unit,
  securing at least one mapping element by means of at least one fixation element on the patient's rigid body part,
  establishing at least one second image displaying the rigid body part on which the at least one fixation element and the at least one mapping element are secured,
  aligning, by means of the control unit the at least one first and second images with regards to the internal referential,
  detecting, by means of the control unit the position of the at least one mapping element, in order to determine the 3D frame position of each fixation element with regards to the internal referential,
  securing, if necessary, the tracker elements on the fixation elements,
  starting the signal emission of the internal tracker,
  tracking and localizing, in real time, by means of the control unit the internal tracker,
  the method can further include two more steps taking place after securing at least one mapping element by means of at least one fixation element on the patient's rigid body part,
  establishing at least one new first image displaying the patient's target body part and replacing the previous one in the memory of the control unit,
  establishing at least one new second image displaying the patient's rigid body part, and replacing the previous one in the memory of the control unit,
  the last step can be: visualizing, in real time, the internal tracker inside the at least first pre-established image, or on a real time acquired image.

DETAILED DESCRIPTION

To carry out a surgical operation including a millimetric or sub-millimetric implantable or introducible device, for example a neurosurgical operation using an implantable micro-robotic system or a heart operation using a catheter, the device needs to be registered on medical imaging used to plan the operation and/or to monitor the operation in real time.

In other words, the device has to be monitored. This is obtained by means of the signal tracking system 10 of the current invention.

In a clinical perspective, any patient needs a specific external 3D frame system mounted around the body part to be operated, specifically around their head in the specific case of brain surgery. This external 3D frame system is essential in order to track a millimetric or sub-millimetric device like, for example, a microrobot that operates inside the brain. The signal tracking system 10 according to the present invention thus comprises:
- at least one fixation element 12 designed to be secured to a rigid body part 14 of a patient, for example a skull,
- at least one mapping element 16,
- at least one tracker element 18,
- a control unit 20.

Figure 1:
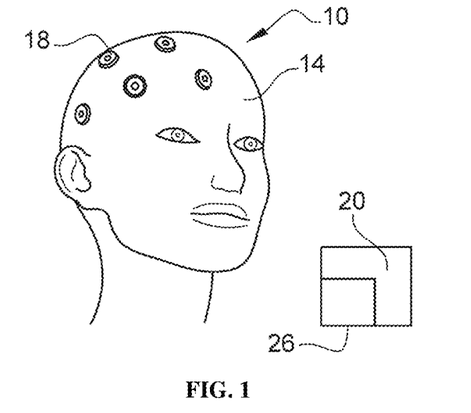
FIG. 1 is a perspective view of the system displaying several fixation elements and sensor elements regularly secured to a human head around a target body part, in communication with a control unit.
Figure 2:
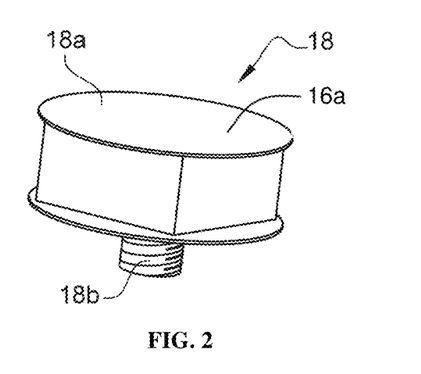
FIG. 2 is a perspective view of a sensor element according to the present invention.

As can be seen on FIG. 1, in order to maximize efficiency, the tracking system 10 needs several tracker elements 18 to be distributed around a target body part 22 in order to create an external 3D frame system. The tracker elements 18 are distributed around the target body part 22 in order to allow a surgeon to operate in a sufficiently large workspace. In that perspective, several tracker elements 18 are secured on a patient's rigid body part 14 surrounding said target body part 22. In the currently described embodiment, the target body part 22 is the patient's brain and several tracker elements 18 need to be screwed on the skull. In the described embodiment, each tracker element 18 comprises at least one tracker head 18a and one tracker fixation rod 18b (see FIG. 2). Each tracker head 18a comprises at least one ultrasound transducer. Thus, similarly to a GPS system, the several tracker elements 18 are regularly distributed around the subject's head and form satellite-like implants.

ach tracker head 18a further continually communicates, in real time, with the control unit 20. The measured signals are thus, continually and in real time, sent by each tracker element 18 to the control unit 20.

Figure 3:
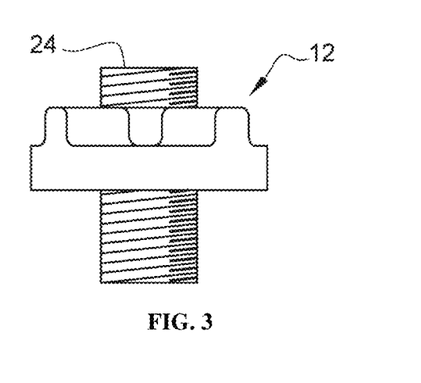
FIG. 3 is a perspective view of a fixation element according to the present invention.

As can be seen on FIG. 2, in some embodiments, each tracker fixation rod 18b displays an external screw thread designed to cooperate with an internal screw thread 24 formed inside each fixation element 12 (see FIG. 3). In order to secure each tracker elements 18 to the rigid body part 14 of the subject, the tracking system 10 comprises the same amount of fixation elements 12. An example of a fixation element 12 is illustrated on FIG. 3. The fixation element 12 are made with well-known biocompatible and inert materials such as PEEK, silicone or titanium. Each fixation elements 12 enables the tracker elements 18 and the mapping elements 16 to be safely secured to the skull of the patient. In some embodiments, the tracker elements 18 are removably secured to the fixation elements 12, and in some other embodiments, they are part of the same piece. In any case, the fixation of the tracker elements 18 to the rigid body part 14 necessitates to open the patient's body, in particular, the patient's scalp which is a highly vascularized tissue and thus limits the number of incisions. Further, each time tissues are opened, infection risks grow with the operation time, particularly long in a neurosurgical context. It is thus important to allow the fixation elements 12 to be secured quickly with a minimal tissue opening. In some alternative embodiment, gluing the fixation elements 12 may be an alternative to screwing them to the rigid body part 14. Depending on the embodiment, the tracker element 18 can be secured over or under the patient's skin: in some embodiments, the fixation element 12 is secured inside the rigid body part 14 of the patient and the at least one tracker element 18 is thus also secured inside the rigid body part 14, and thus, under the skin. This necessitates to bore a small hole inside the rigid body part 14 but improves safety as the skin can be closed.

Depending on the embodiment, two kind of fixation elements 12 are possible:
- secured to, or inside the rigid body part 14, meaning that the rigid body part 14 (or a part of it) remains between the target body part 22 and the tracker element 18 (in the depicted embodiment, this means that the fixation element 12 is screwed or glued on the skull), or
- secured through the rigid body part 14, meaning that the fixation element tunnels 12 the rigid body part 14 and puts the tracker element 18 in direct contact with the target body part 14 (in the depicted embodiment, this means that the fixation element 12 is screwed through the skull and the tracker element 18 is in direct contact with the brain).

The direct contact embodiment enables to limit the tracked signal attenuation as the tracker element 18 is not separated from the target body part 22 by the rigid body part 14 (in this case respectively the subject's brain and the skull). In this embodiment, and in the embodiment where the fixation element 12 is secured inside the rigid body part 14, a half burr hole about 1 cm in diameter (2 cm maximum) is made by the surgeon. However, this gesture necessitates a neuro-anaesthetist to manage undesirable events such as heavy bleeding, or partial skull collapses, for example. In the embodiment without direct contact, the fixation element 12 dimension is limited by the shape of the rigid body part 14, in this case, the circular shape of the skull. In the embodiment where the fixation element 12 is secured inside the rigid body part 14, the same kind of a half burr hole about 1 cm in diameter (2 cm maximum) is made by the surgeon and present the same constraints and risks as the direct contact embodiment. However, as already mentioned, this embodiment enables to close the skin over the fixation element 12 and the tracker element 18 and thus, improves safety. Regarding the embodiment where the fixation elements 12 are secured on the rigid body part 14, in the skull case, each fixation element 12 needs to be in contact with the skull and cannot be secured on a high curvature point.

The fixation element 12 size is minimized in order to decrease the size of the screw and thus the stress of the patient. The dimensions of the fixation element 12 should be compatible with a local anesthesia, they thus display a diameter of 2 cm and a height of 1 cm, especially in case the fixation element 12 has to be secured inside (or embedded inside) the rigid body part 14.

As already mentioned, to carry out a surgical operation including a millimetric or sub-millimetric implantable or introducible device, the device needs to be registered on medical imaging used to plan the operation and/or to monitor the operation in real time. In order to obtain medical imaging, for example for a microrobot operating inside a subject's brain, surgeons usually plan and follow operations on MRI and/or CT images. Computed Tomography (CT) scanner consists of an X-ray tube coupled to a scintillation detector, mounted face-to-face on a rotating gantry. CT scans provide image slices of the target organ by preplanned translation and rotation of the sensor array.

Magnetic resonance imaging (MRI) uses signals emitted by mobile hydrogen (protons) within the human body. Due to their electric charge, their spin generates a detectable magnetic field. An MRI measurement consists of three steps:
- superconductive magnet creates a stationary external magnetic field which causes a few mobile protons per million to align and reach a low energy state,
- transmit coils generate RF radiations,
- after RF radiations stop, protons relax and emit photons at their resonance frequency,
- relaxation time constants are measured to obtain MRI images.

In some cases, for example an emergency case, the surgeon is able to acquire at least one unique image displaying at least a portion of the patient's target body part 22 or an element situated inside said target body part 20, and the at least one fixation element 12 and the at least one mapping element 16. The control unit 20 can then define into a coordinate system (or internal referential R), at least one 3D frame position attached to the at least one fixation element 12, and can thus, precisely locate each point of the target body part 22 with regards to the 3D frame position.

Due to the different physiological properties of the tissues of the rigid body part 14 and the tissues of the target body part 22 surgeons have most of the time to plan operations on both MRI and CT images (MRI imagery being used for the soft target body part 22 and CT imagery being used for the rigid body part 14). These different images can be aligned with a multimodal registration process. According to any person skilled in the art, the goal of an image registration process is to find the optimal transformation that best aligns the structures of interest (the target body part 22, the rigid body part 14 and the external 3D frame formed by the fixation elements 12) in the different images. Regarding the current invention, the registration process aligns the at least one first image (for example an MRI image) displaying the target body part 22 on at least one second image (for example CT images) displaying the rigid body part 14 on which the fixation elements 12 are secured.

In some alternative embodiment, the registration process first aligns the at least one first image with an image displaying the rigid body part 14 on which the fixation elements 12 are secured. The registration process then aligns the two preceding images with the at least one second image displaying the rigid body part 14 on which the fixation elements 12 are secured.

As well known by any person skilled in the art, a registration process is an algorithm which converges, through multiple iterations, towards a similarity measurement maximum and aligns the at least two images into a coordinate system (or internal referential R) found with a previous geometric transformation well known in the state of the art. The registration process algorithms use image information to establish a specific measurement called similarity. Those algorithms are commonly based on voxel intensity, gradient intensity, frequency study (Fourier space) or statistical information about intensities or features (edges, contours, etc.) in the images to be aligned. This way, the internal referential R is defined within the pre-established image displaying at least the portion of the patient's target body part 22 or the element situated inside said target body part 20.

The present invention thus enables to define an internal referential on the first 3D image of the target body part 22 which is set as the reference and defines/comprises the internal referential R.

The goal of a registration process during a surgical operation is to establish a 3D transformation between an external 3D frame and an internal 3D frame, meaning the 3D frame of the target body part 22. According to the present invention, as already mentioned, the several fixation elements 12 secured to the rigid body part 14 of the subject form the external 3D frame. This means that, in order to proceed with the registration process, each fixation element 12 must be precisely detected and its precise position obtained within the predetermined referential R. This referential R may for example be the rigid body part 14 or any other element present on one of the images. It might also be an external element defined independently to what is to be seen on the images. This internal referential R is stored inside a memory 26 of the control unit 20. The memory 26 of the control unit 20 also stores:
- the least one first image displaying the patient's target part 22 (internal 3D frame),
- the at least one second image displaying the rigid body part 14 which the fixation elements 12 and the mapping elements 16 are secured (external 3D frame), and
- any further image which might be used for obtaining a clear and precise alignment.

The control unit 20 runs the registration process algorithm and is thus designed to align all the images within the internal referential R and is then able to localize each point of the target body part 22 inside said internal referential R.

This image alignment further enables the control unit 20 to establish, for each fixation element 12, a 3D frame position within the internal referential R. When the control unit 20 aligns the external and internal 3D frames, each 3D frame position is thus defined, like any point of the target body part 10, inside the internal referential R. The 3D frame position of each fixation element 12 is thus clearly established with regards to the target body par 10. In order to allow either the direct establishing of the 3D frame position inside the internal referential R or to allow the registration process algorithm to run, each fixation element 12 comprises a mapping element 16. As shown on FIG. 4, the mapping element 16 comprises a mapping head 16a and a connection rod 16b. In the represented embodiment, the mapping element 16 can be removably secured to the fixation element 12. In other embodiments, not represented, the mapping element 16 forms a single piece with the fixation element 12. In the illustrated embodiment, each connection rod 16b displays an external screw thread designed to cooperate with the internal screw thread 24 formed inside each fixation element 12 (see FIG. 3). The connection rod 16b thus cooperates with the fixation element 12 in order to secure the mapping element 16 to the fixation element 12. Some other embodiments, not shown, might be imagined.

Figure 4:
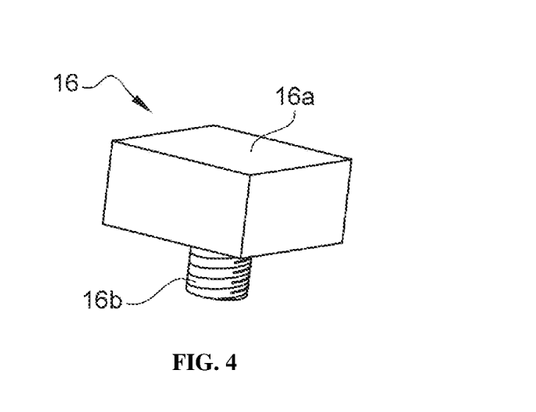
FIG. 4 is a perspective view of a mapping element according to the present invention.

As can be seen on FIG. 4, the mapping head 16a displays a specific shape which allows an easy recognition and localization of the mapping head 16a and thus of the fixation element 12 to which it is connected. The head 16a of the mapping element 16 is thus a 3D square fiducial.

In some embodiments, the mapping elements 16 and tracker element 18 are all CT compatible.

When each fixation element 12 and point of the target body part 10 is precisely localized within the internal referential R, the control unit 20 and the tracker elements 18 precisely localize, in real time, within the internal referential R, any internal tracker 28, for example a signal emitting source situated inside the target body part 22. More precisely, as the at least one fixation element 12 in the target body part image is detected, this allows the obtention of the 3D position of this fixation element 12 in the internal referential R. As each tracker elements 18 is attached to each fixation element 12, it enables to directly know their 3D positions inside the internal referential R. Any internal tracker 28 can thus be tracked within the internal referential R directly.

This enables a more direct, reliable and efficient tracking, contrary to other systems which necessitates to define at least two referentials, one with regards to the patient and one with regards to the system itself.

This internal tracker 28 might also be a signal sensor, configured to sense some signal emitted by the tracker elements 18. In the current application, the term "sensor" is understood as being a receptor. In some embodiments, the internal tracker 28 can be a contrast agent dropped by a micro-device. A contrast agent may be any micro-element sized around 1 micron which highly reflects ultrasounds, like for example microbubbles. In some embodiments, the internal tracker 28 might be part of a micro-device which might be steered from outside the patient's body.

In case the internal tracker 28 is a signal emitting source, it can be a primary source (an active implantable device) or a secondary source. The secondary source is designed to reflect a signal emitted by another primary source. This secondary source can be a passive implanted device, like for example a passive micro-tracker. In case the signal emitting source is a secondary source, the primary source can be external to the patient's body, and more particularly, the primary source can be one of the several tracker elements 18 secured around the target body part 22. In this case, the primary source sends a signal inside the target body part 22 and the signal source reflects this signal back to the tracker elements 18 secured to the rigid body part 14. In the particular case where the tracker elements 18 are ultrasound transducers, one of them, secured on the patient's rigid body part 14 (for example a skull), sends ultrasounds inside the target body part 22 (for example the patient's brain). In any case, the signal emitting source emits waves which travel towards the rigid body part 14 where one or more further tracker elements 18 are implanted. The time of flight between the initial sending and the reception is used to obtain the distance travelled by the waves. With several tracker elements 18 involved, at least three, it allows to obtain the 3D position of the emitting signal source relatively to the tracker elements 18.

In case the internal tracker 28 is a sensor, it works in a similar way: the time of flight between the initial sending from the tracker elements 18 and the reception is used to obtain the distance travelled by the waves. With several tracker elements 18 involved, at least three, it allows to obtain the 3D position of the internal tracker 28 relatively to the tracker elements 18.

It is well known by any person skilled in the art that most tracker elements 18 (for example ultrasound transducers) are CT imagery compatible but not MRI imagery compatible because of their composition. This strongly limits the use of such a system in clinical environments which are more and more MRI based as the MRI commonly allows surgeons to check the state of target body parts 22 during the operation.

However, as the memory 26 of the control unit 20 stores an accurate image of the target body part 22 aligned with an accurate image of the rigid body part 14 and the external 3D frame comprising the fixation elements 12, the position of the internal tracker 28 can thus, in real time, be translated by the control unit 20 into an image shown to the surgeon, on a screen, during operation. The surgeon is thus able to precisely visualize the internal tracker 28 inside the target body part 22 of the patient.

Figure 6:
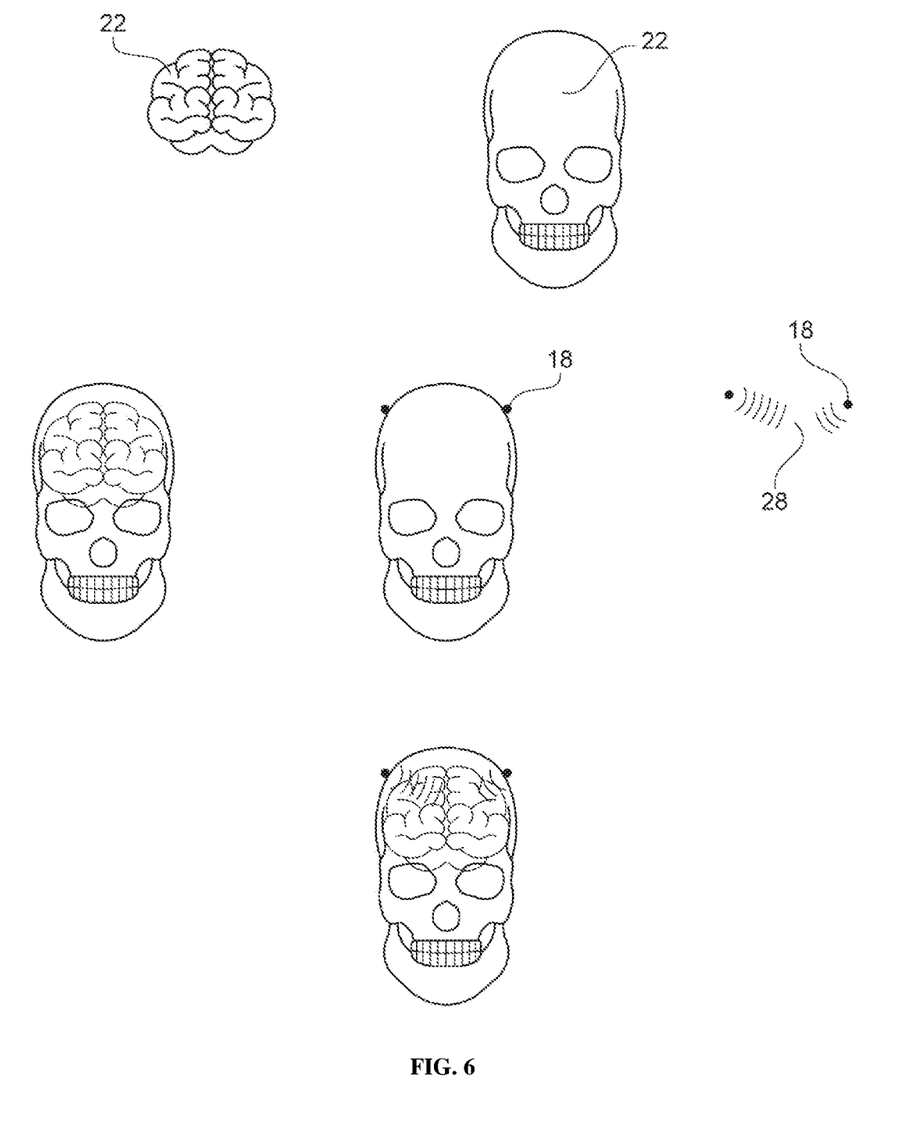
FIG. 6 is a schematic illustration of the tracking method according to the present invention.

The tracking system 10 according to the invention enables a surgeon to carry out a signal localization method as depicted on FIG. 6. This method allows to localize, within the internal referential R, the internal tracker 28 situated inside the target body part 22 of the patient. In case only one unique image is needed, the method comprises following steps in the chronological order of enunciation:

securing at least one mapping element 16 by means of at least one fixation element 12 on the patient's rigid body part 14, establishing at least one unique image displaying at least a portion of the patient's target body part 22 or an element situated inside said target body part 22, said image further displaying the at least one fixation element 12 and the at least one mapping element 16, storing the at least one unique image in the memory 26 of the control unit 20, aligning the at least one unique image with the internal referential R, detecting, by means of the control unit 20 the position of the at least one mapping element 16, in order to determine the 3D frame position of each fixation element 12 with regards to the internal referential R, securing, if necessary, the tracker elements 18 on the fixation elements 12, starting the signal emission of the internal tracker 28, tracking and localizing, in real time, by means of the control unit 20 the internal tracker 28.

It the quality of the unique image is good enough, the method may include the visualizing, in real time, the internal tracker 28 inside the at least one unique pre-established image. The internal tracker may also be visualized on an image acquired in real time. This real time acquired image can be acquired by an external means, for example an ultrasound probe.

In case two or more images are needed, the method comprises following steps in the chronological order of enunciation:

establishing at least one first image displaying the patient's target body part 22 by means of an MRI imagery and storing it in the memory 26 of the control unit 20, in some cases, establishing at least one further image displaying the patient's rigid body part 14 by means of CT imagery and storing it in the memory 26 of the control unit 20, designing a preoperative planning in defining the robotic surgical operation, securing at least one mapping element 16 by means of at least one fixation element 12 on the patient's rigid body part 14, establishing at least one second image displaying the rigid body part 14 on which the at least one fixation element 12, the at least one mapping element 16 are secured and the tracker elements 18, in case the tracker elements 18 and the fixation elements 12 are made of one piece, aligning, by means of the control unit 20 the at least one first, second and third images with regards to the internal referential R, detecting, by means of the control unit 20 the position of the at least one mapping element 16, in order to determine the 3D frame position of each fixation element 12 with regards to the internal referential R, in some case, if the tracker elements 18 are removable from the fixation elements, securing the tracker elements 18 on the fixation elements 12, starting the signal emission of the internal tracker 28, tracking and localizing, in real time, by means of the control unit 20 the internal tracker 28, visualizing, in real time, the internal tracker 28 inside the at least first pre-established image, or on an image acquired in real time. This real time acquired image can be acquired by an external means, for example an ultrasound probe.

More precisely, after the placement of the fixation elements 12, new CT and MRI images are taken and registered, inside the memory 26 of the control unit 20 on the previous images taken before the fixation elements 12 placement. In these new images, the fixation elements 12 are detected and localized by means of the mapping heads 16a of the mapping elements 16 secured to the fixation elements 12. This enables the control units 20 to achieve the registration between the ultrasound tracking and the brain images. As most sensor elements 18 are not MRI compatible, in some embodiments, the sensor elements 18 are secured to the fixation elements 12 after the establishment of the MRI images. Thus, after the registration process, the mapping elements 16 are removed from the fixation elements 12 (if they are removable) and replaced by the sensor elements 18. In case the fixation elements 12 and the mapping elements 16 form indissociable elements, the tracker elements 18 are simply secured to the fixation elements 12. And in case the tracker elements 18 and the fixation elements 12 are made of the same piece, they are both secured together to the rigid body part 10. Depending on the embodiment, this implies that the tracker elements 18 are MRI compatible.

In addition to the registration concept, the implants can be used to estimate the geometrical errors from MRI images and registration errors between CT and MRI images.

After the step of securing the fixation elements 12 on the rigid body part 14, either:
the patient's skin is closed with a suture, or
the fixation elements 12 are small enough (around 2 to 6 mm) to just be covered with a dressing.

Figure 5:
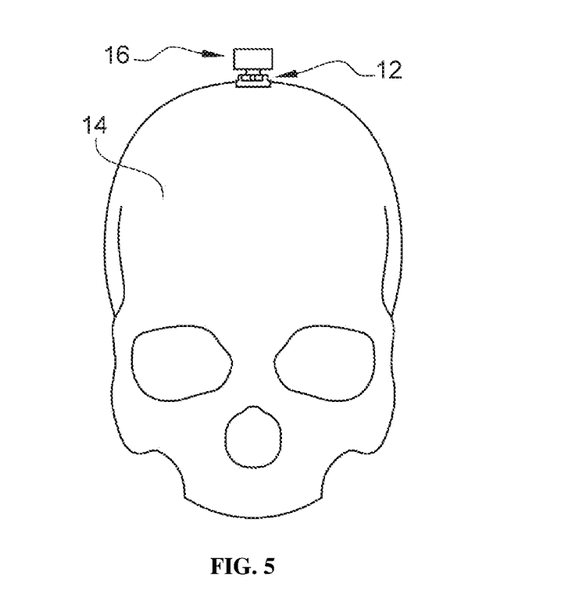
FIG. 5 is a perspective view of a fixation element and a mapping element secured to a human skull.

As can be seen on FIGS. 1 and 5, the tracking system 10 is mini to non-invasive, is not harmful for the subject's body and provides a sub-millimetric accuracy until 100 mm to 500 mm deep inside the subject's target body part 22 (for example the brain) with a frequency, for example, higher than 20 Hz.

The tracking system 10 and localization method according to the present invention improve the comfort and security of deep surgical interventions. It for example enables local anaesthesia for each fixation element 12 instead of a heavy global anaesthesia.

Another very important element is the error limitation: the tracking system according to the present invention allows to circumvent the manual settings of the fixation elements 12 position. Further, with the sensor elements 18, any internal tracker 28 is directly detected as soon signal is emitted or sensed.

Finally, the tracking system 10 according to the present invention removes the need of device-related adjustments, hence reduces the risk of human interference via manual settings (3D frame-based systems). It also cancels the need of constant verification on image guidance and does not depend on the surgeon's hand-eye coordination.

More precisely, one of the main technical advantages is the creation of solely one referential, attached to the patient and not, for example, to the operation room. This allows the patient to be moved without losing the alignment that the present invention achieves, contrary to other systems in which this alignment is lost as soon the patient's body is moved in relation to the external reference positioned in the operation room.

The invention claimed is:

1. A signal tracking system being configured to track an internal tracker situated inside a target body part of a patient, the system comprising:
at least one fixation element designed to be secured to a rigid body part of the patient, said rigid body part surrounding at least partially the target body part, the fixation element further comprising a mapping element,
at least one tracker element configured to be secured to the fixation element, the at least one tracking element being designed to track, in real time, the internal tracker,
a control unit configured to collect, in real time, tracking information from the at least one tracker element, the control unit further comprising a memory designed to store:
an internal referential,
at least one unique pre-established image displaying at least a portion of the patient's target body part or an element situated inside said target body part, the unique pre-established image further displaying the at least one fixation element and the at least one mapping element,
wherein the internal referential is defined within the unique pre-established image displaying at least the portion of the patient's target body part or the element situated inside said target body part,
wherein the control unit is designed to define, inside the internal referential, at least one 3D frame position attached to the at least one fixation element, and to precisely locate the portion of the patient's target body part or element situated inside said target body part with regards to the 3D frame position,
wherein the control unit is further designed to precisely localize, in real time, within the internal referential, the internal tracker inside the target body part with regards to the at least one 3D frame position.

2. The tracking system according to claim 1, wherein the memory is further designed to store:
the internal referential,
at least one first pre-established image displaying the patient's target part,
at least one second pre-established image displaying the rigid body part on which the at least one fixation element and the at least one mapping element are secured,
wherein the internal referential is defined within the first pre-established image displaying at least the portion of the patient's target body part or the element situated inside said target body part,
wherein the control unit is designed to align the at least one first and second pre-stablished images within the internal referential, in order to define, inside the internal referential at least one 3D frame position attached to the at least one fixation element, and to precisely locate any portion of the patient's target body part or element situated inside said target body part with regards to the 3D frame position,
wherein the control unit is further designed to precisely localize, in real time, within the internal referential, the internal tracker inside the target body part with regards to the at least one 3D frame position.

3. The tracking system according to claim 1, wherein the at least one tracker element is configured to be removably secured to the fixation element.

4. The tracking system according to claim 1, wherein the at least one fixation element is designed to be secured inside the rigid body part of the patient, the at least one tracker element being also secured, to the fixation element inside the rigid body part.

5. The tracking system according to claim 1, wherein the at least one fixation element, mapping element and tracker element are all CT compatible, the at least one second image being a CT image.

6. The tracking system according to claim 1, wherein the fixation element and the mapping element are both MRI compatible, the at least one first image being an MRI image.

7. The tracking system according to claim 1, wherein the internal tracker is a signal emitting source.

8. The tracking system according to claim 7, wherein the internal tracker is a secondary source designed to reflect a signal emitted by a primary source.

9. The tracking system according to claim 8, wherein the primary source is external to the subject's body.

10. The tracking system according to claim 9, wherein the primary source is the at least one tracker element.

11. The tracking system according to claim 1, wherein the internal tracker is a contrast agent.

12. The tracking system according to claim 1, wherein the internal tracker is part of a device.

13. A signal tracking method configured to position, within an internal referential, an internal tracker situated inside a target body part by means of a tracking system according to claim 1, the method comprising following steps in the chronological order of enunciation:
securing at least one mapping element by means of at least one fixation element on the patient's rigid body part,
establishing at least one unique image displaying at least a portion of the patient's target body part or an element situated inside said target body part, said image further displaying the at least one fixation element and the at least one mapping element,
storing the at least one unique image in the memory of the control unit,
aligning the at least one unique image with the internal referential,
detecting, by means of the control unit the position of the at least one mapping element, in order to determine the 3D frame position of each fixation element with regards to the internal referential,
securing, if necessary, the tracker elements on the fixation elements,
starting the signal emission of the internal tracker,
tracking and localizing, in real time, by means of the control unit the internal tracker.

14. The signal tracking method according to claim 13, wherein the method comprises following steps in the chronological order of enunciation:
establishing at least one first image displaying the patient's target body part and storing it in the memory of the control unit,
securing at least one mapping element by means of at least one fixation element on the patient's rigid body part,
establishing at least one second image displaying the rigid body part on which the at least one fixation element and the at least one mapping element are secured,
aligning, by means of the control unit the at least one first and second images with regards to the internal referential,
detecting, by means of the control unit the position of the at least one mapping element, in order to determine the 3D frame position of each fixation element with regards to the internal referential,
securing, if necessary, the tracker elements on the fixation elements,
starting the signal emission of the internal tracker,
tracking and localizing, in real time, by means of the control unit the internal tracker.

15. The method according to claim 14, wherein the method includes two more steps taking place after securing at least one mapping element by means of at least one fixation element on the patient's rigid body part,
establishing at least one new first image displaying the patient's target body part and replacing the previous one in the memory of the control unit,
establishing at least one new second image displaying the patient's rigid body part, and replacing the previous one in the memory of the control unit.

* * * * *

UNITED STATES PATENT AND TRADEMARK OFFICE
CERTIFICATE OF CORRECTION

| | | |
|---|---|---|
| PATENT NO. | : 12,433,504 B2 | Page 1 of 1 |
| APPLICATION NO. | : 18/256710 | |
| DATED | : October 7, 2025 | |
| INVENTOR(S) | : Quentin Francois et al. | |

It is certified that error appears in the above-identified patent and that said Letters Patent is hereby corrected as shown below:

On the Title Page

Item (54) and in the Specification, Column 1, Lines 1-3, Title, please change from POSITION TRACKING SYSTEM FOR TRACKING AN INTERNAL DEVICE DURING AN IMAGING to "POSITION TRACKING SYSTEM FOR TRACKING AN INTERNAL DEVICE DURING AN IMAGING PROCEDURE"

Signed and Sealed this
Eleventh Day of November, 2025

John A. Squires
*Director of the United States Patent and Trademark Office*